M. A. NEELAND.
FURNACE.
APPLICATION FILED JULY 11, 1911.

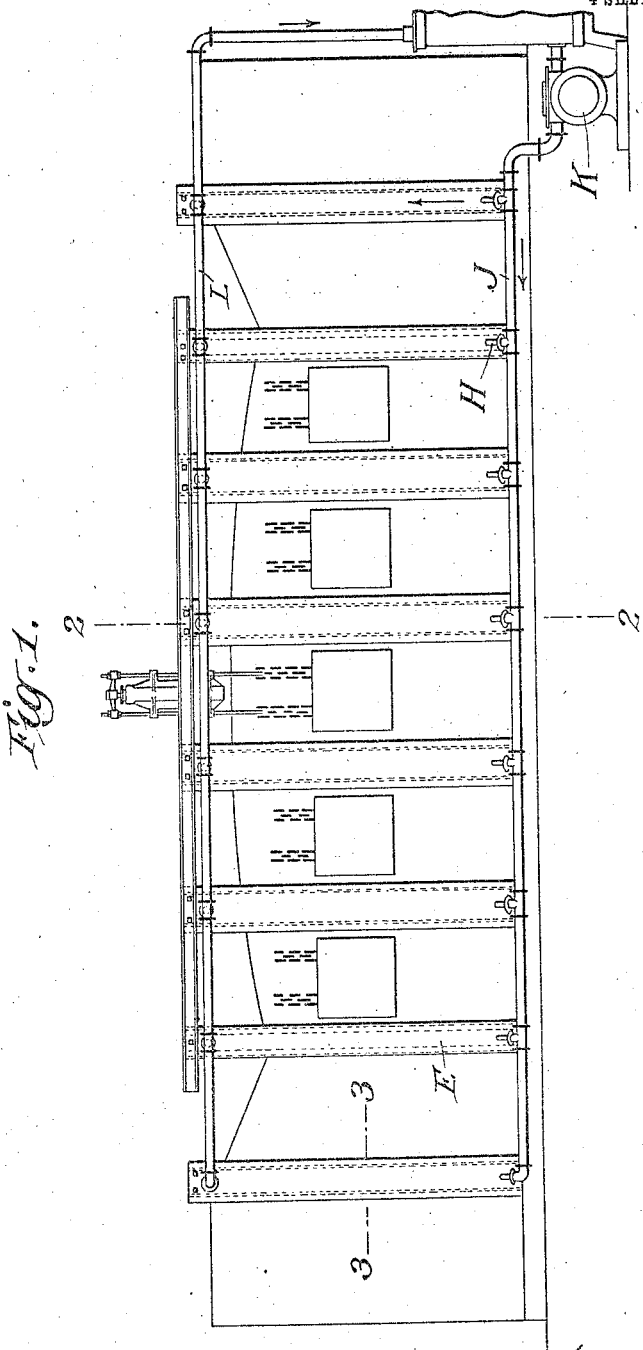

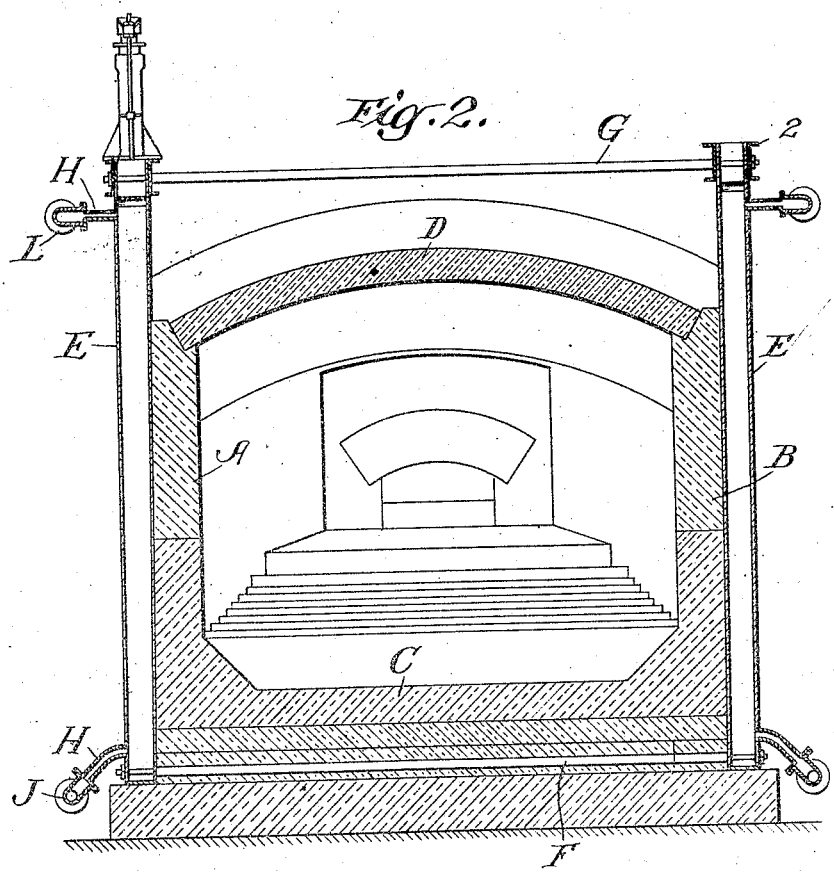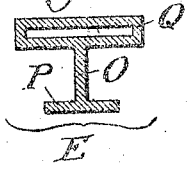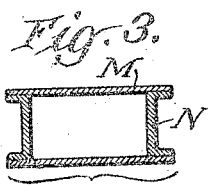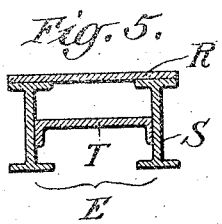

1,011,476.

Patented Dec. 12, 1911.
4 SHEETS—SHEET 3.

WITNESSES
INVENTOR
Marvin A. Neeland,
BY
Linthicum Belt & Fuller
ATTORNEYS

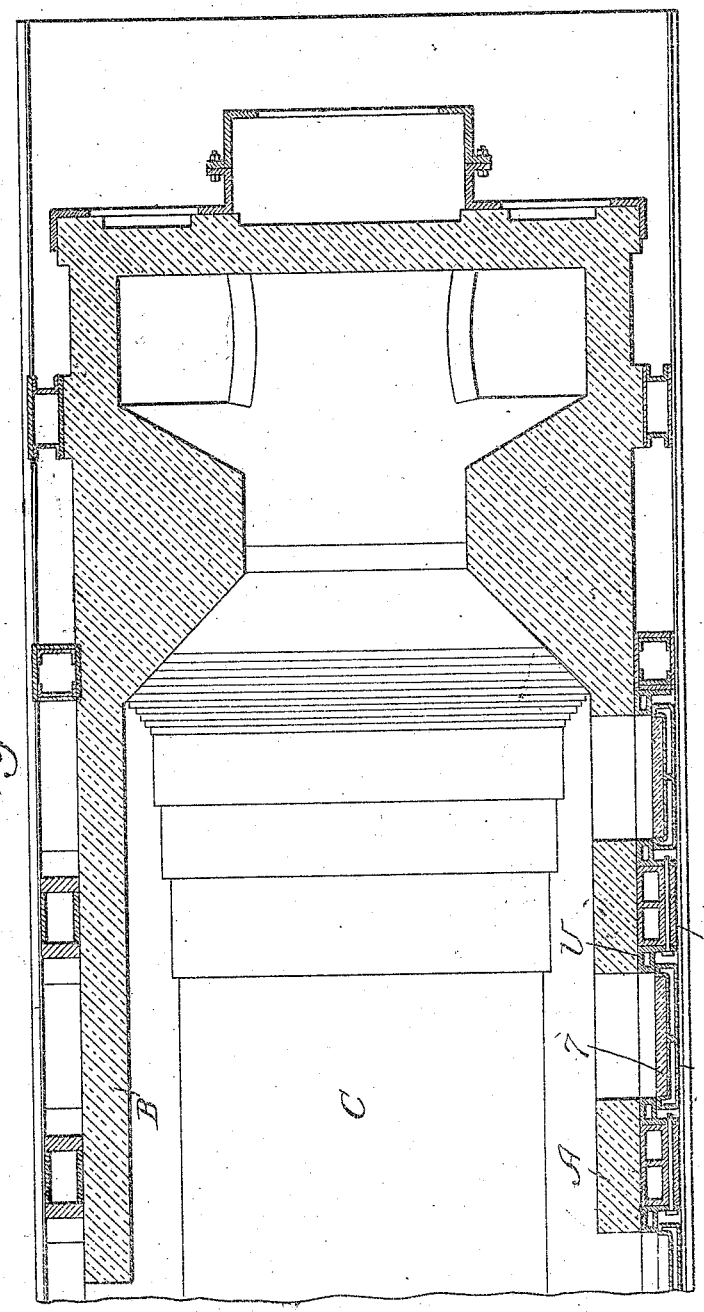

UNITED STATES PATENT OFFICE.

MARVIN A. NEELAND, OF MONTCLAIR, NEW JERSEY.

FURNACE.

1,011,476. Specification of Letters Patent. Patented Dec. 12, 1911.

Application filed July 11, 1911. Serial No. 637,954.

*To all whom it may concern:*

Be it known that I, MARVIN A. NEELAND, a citizen of the United States, residing in Montclair, New Jersey, have invented new and useful Improvements in Furnaces, of which the following is a specification.

In open-hearth furnaces as used in steel manufacture and in other furnaces of similar type the walls are made of brick work with a roof of brick work extending from front to rear, and steel stays are arranged against the outer faces of the front and the rear walls, which stays are connected at the top and bottom and serve to prevent the walls from bulging outward under the thrust of the roof. Nevertheless, in the course of time these stays yield by bending and allow the roof to distort and crack, necessitating rebuilding or repairing of the walls and roof every year or two, and necessitating also the replacement of the stays. The stays for each furnace cost several thousand dollars so that their replacement involves a considerable expense in addition to the cost of rebuilding or repairing the brick work. Efforts have been made to avoid this difficulty by increasing the size of the stays, but this expedient has been found of little value.

The present invention aims to provide stays for such furnaces which shall hold their shape permanently, or much more durably than has heretofore been the case.

I have discovered that the bending of the stays is due not so much to any weakness of the metal, as to the fact that under the conditions of use the metal becomes heated to such an extent as to weaken its resistance to flexing strains and to allow it to yield little by little until its usefulness is practically destroyed; and I have discovered that this weakening takes place chiefly, but not solely, in the stays which are located along the front wall of the furnace adjacent to the doors. Apparently the heat escaping from the doors when the latter are open is so great as to add considerably to the heating and weakening of the adjacent stays. I propose to remedy this difficulty and to secure certain other advantages by water cooling at least the front stays and preferably both the front and the rear stays so as to prevent their softening and buckling under the strain to which they are subjected. Preferably the doors and door frames are similarly cooled.

The accompanying drawings illustrate specific applications of the invention to an open-hearth steel furnace.

Figure 1 is a front elevation. Fig. 2 is a vertical cross section of Fig. 1 on the line 2—2. Figs. 3, 4 and 5 are horizontal cross sections of different types of stay. Fig. 6 is a front elevation of another construction embodying the invention. Fig. 7 is a horizontal section of one of the stays of Fig. 6 on the line 7—7. Fig. 8 is a vertical section of the same on the line 8—8. Fig. 9 is a horizontal section of the furnace of Fig. 6 on the line 9—9.

Referring to the furnace illustrated and first to Figs. 1 and 2, the front wall A and rear wall B are located at opposite sides of the hearth C and are spanned by an arched roof D, the thrust of which is taken by the front and rear walls. The walls, hearth and roof are made of brick work or other masonry. The thrust of the arch on the side walls is taken by vertical stays, commonly called buckstays, E. Extending through the hearth from front to rear and connecting the opposite buckstays are tie rods F. Similarly extending from front to rear above the roof are tie rods G connecting the upper ends of the buckstays. The buckstays are closed at their upper ends and are provided with channels for the circulation of water. The buckstays at the front are provided with branches H at their lower ends connecting with a feed pipe J, through which water is forced by a pump K. The upper ends of the buckstays are provided with similar branches H communicating with a common discharge pipe L, leading to a tank or other suitable point of disposal. A similar arrangement of branches and pipes is provided for the buckstays of the rear wall, the feed pipe thereof being connected either to a separate pump or to the same pump K with a suitable valve system to permit the circulation of the water through only the front stays if desired.

The channels or passages in the buckstays may be provided with a variety of constructions. According to Figs. 1, 2 and 3 each of the buckstays is composed of front and rear plates M connected by channels N so as to constitute a rectangular tube.

Fig. 4 shows a cast buckstay having an ordinary web O and outer flange P and an inner flange Q cast hollow to carry the circulating water.

Fig. 5 shows the buckstays composed of an inner plate R, I-beams S at its edges and an intermediate plate T forming an inclosed space for the circulation of the water. The constructions shown in Figs. 4 and 5 concentrate the cooling stream at the parts of the buckstay which are immediately against the hot brick work and have a slight advantage in this respect.

Figure 6:
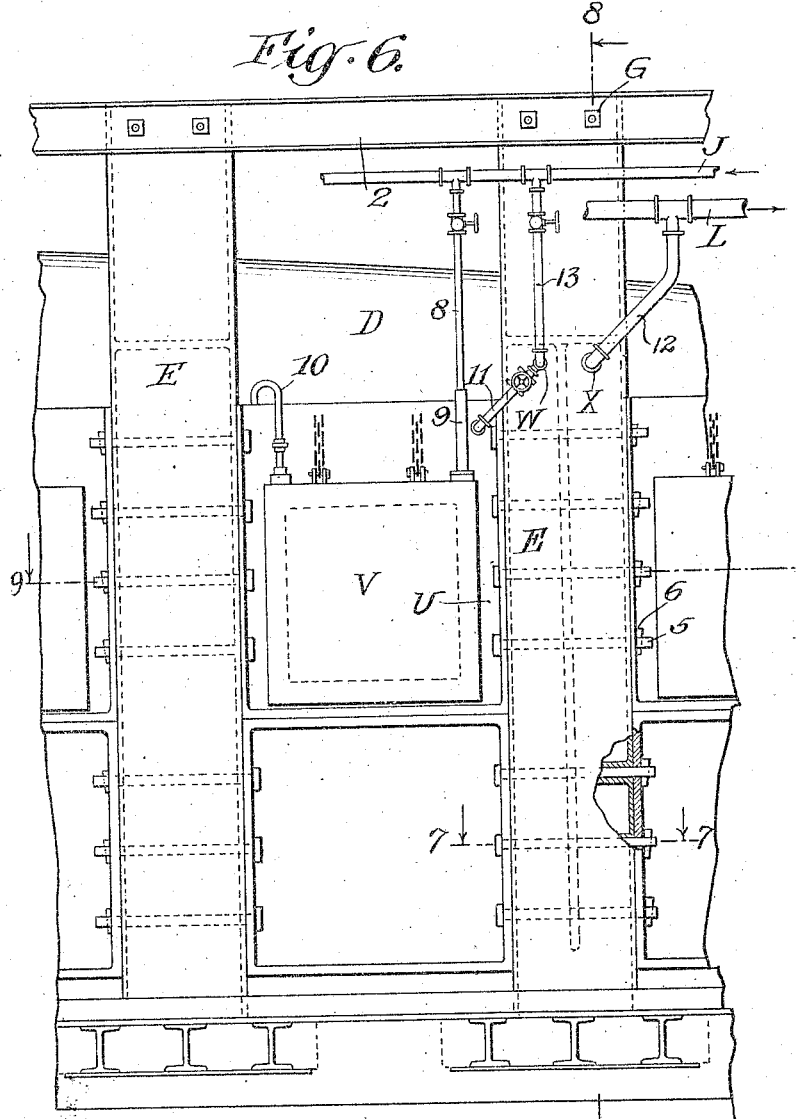
Figure 8:
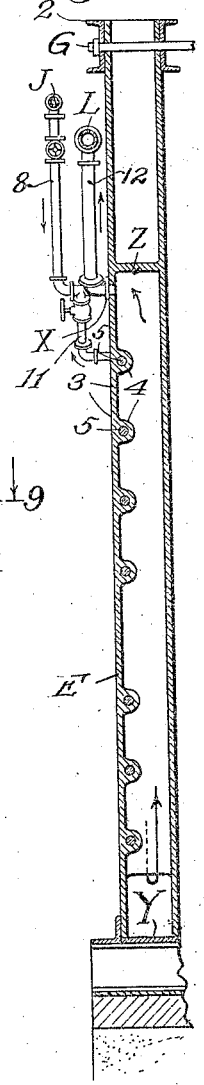
Figure 7:
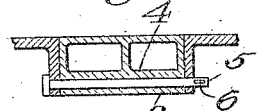

Figs. 6, 7, 8 and 9 show the entire front or charging face of the furnace covered with water cooled metal so that all the brick work of the front wall will be kept comparatively cool and it will be preserved from the immediate effects of high heating as well as held in place by the buckstays and adjacent metal parts. The door also is made of a hollow cast frame adapted to be water cooled, with a refractory lining or inner face. The buckstays E in this case are cast rectangular boxes adapted to fill the entire spaces between the frames U of the doors V, so that in connection with these frames they cover the entire charging wall of the furnace. They are provided with openings W and X for inflow and outflow of the cooling water, are closed at the bottom by a plate Y and near the top by a diaphragm Z; being extended above the diaphragm for connection with the longitudinal beams 2 which in turn are connected with the tie rods G. The outer wall 3 of each of the buckstays is provided on its inner face with bosses 4 through which run bolts 5 for connecting the buckstay with the flanges of the door frames at each side of the stay; the bolts 5 being fastended by wedges 6 which can be readily driven out to permit the withdrawal of the bolts and the removal of any parts of the metal work. Fig. 9 shows that the door frames U are hollow and that each of the doors V is made of a double walled casting suitable for the circulation of water and with a lining 7 of refractory material. This figure shows also the rear wall of the furnace supported by hollow stays adapted for water cooling. The system of cooling the stays in the rear may be applied as described in connection with Figs. 1 and 2.

The water (Figs. 6 and 8) arrives through mains J and is drawn off through mains L, corresponding to the pipes of Fig. 1, though differently located. From the pipe J run valved branches 8 each of which telescopes through a stuffing box 9 into the hollow space within the door V. The water escapes from the door V at the opposite side through a pipe 10 which is fast to the door and is bent down and has its lower end telescoping through a stuffing box in the frame U. The water escapes from the opposite side of the frame U through a short valved pipe 11 which connects the latter with one side of the adjacent buckstay. The water thus passes through the door, then through the door frame, thence into the adjacent buckstay, and thence by the pipe 12 to the discharge main L.

Ordinarily the water passes in series through the door, door frame and buckstay. Means are provided, however, for cutting the door and frame out of the circuit by means of a separate branch pipe 13 branching from the admission main J and provided with a valve by which it is ordinarily closed. The pipes 11 and 13 lead to the same opening in the buckstay E. When the door and frame are to be cut out the valves in pipes 8 and 11 are closed and the valve in 13 is opened. Otherwise the valve in 13 is closed and the valves in 8 and 11 are opened.

What I claim is:—

1. An open-hearth furnace having a front wall of masonry with doors therein, buckstays adapted to prevent outward buckling of said wall, said buckstays being on the outside of the masonry of the front wall, and means for directly water cooling said buckstays.

2. An open-hearth furnace having a front wall of masonry with doors therein, a rear wall of masonry, buckstays adapted to prevent outward buckling of said wall, said buckstays being on the outside of the masonry of the front and rear walls respectively, and means for directly water cooling both the front and the rear buckstays.

3. An open-hearth furnace having a front wall of masonry with doors therein, a rear wall of masonry, a roof of masonry arched between said front and rear walls, buckstays on the outer faces of and bearing against said front and rear walls respectively and tied together, and means for directly water cooling at least the front buckstays to prevent their buckling.

4. An open-hearth furnace having a front wall of masonry with doors therein, a rear wall of masonry, a roof of masonry arched between said front and rear walls, buckstays on the outer faces of and bearing against said front and rear walls respectively and tied together and means for directly water cooling both the front and the rear buckstays to prevent their buckling.

5. An open-hearth furnace having a front wall of masonry with openings for doors therein and door frames surrounding said openings, vertical buckstays directly water-cooled and adapted to prevent outward buckling of said wall, said buckstays being on the outside of the masonry and between said door frames, and means for supporting said door frames by said stays.

6. An open-hearth furnace having a front wall of masonry with doors therein, a rear wall of masonry, a roof of masonry between said front and rear walls, buckstays on the outside of the masonry and adapted to prevent outward buckling of said front and rear walls and connected to each other, the front buckstays being located between the doors of the front wall, and means for directly water cooling the buckstays between the doors.

7. An open-hearth furnace having a front wall with openings for doors therein, water cooled door frames surrounding said openings, water cooled stays between the doors, and means for normally circulating water in series through said door frames and said stays.

8. An open-hearth furnace having a front wall with openings for doors therein, water cooled door frames surrounding said openings, water cooled stays between the doors, means for normally circulating water in series through said door frames and said stays and separate means for supplying water to the stays.

9. An open-hearth furnace having a front wall with openings for doors therein, water cooled door frames surrounding said openings, water cooled doors over same, water cooled stays between the doors and means for circulating water in series through said door frames, doors and stays.

In witness whereof, I have hereunto signed my name in the presence of two subscribing witnesses.

MARVIN A. NEELAND.

Witnesses:
   D. ANTHONY USINA,
   LULU STUBERWOLL.